H. SUNDHAUSSEN.
GYROSCOPIC STABILIZER.
APPLICATION FILED SEPT. 3, 1920.
1,390,471. Patented Sept. 13, 1921.
2 SHEETS—SHEET 1.
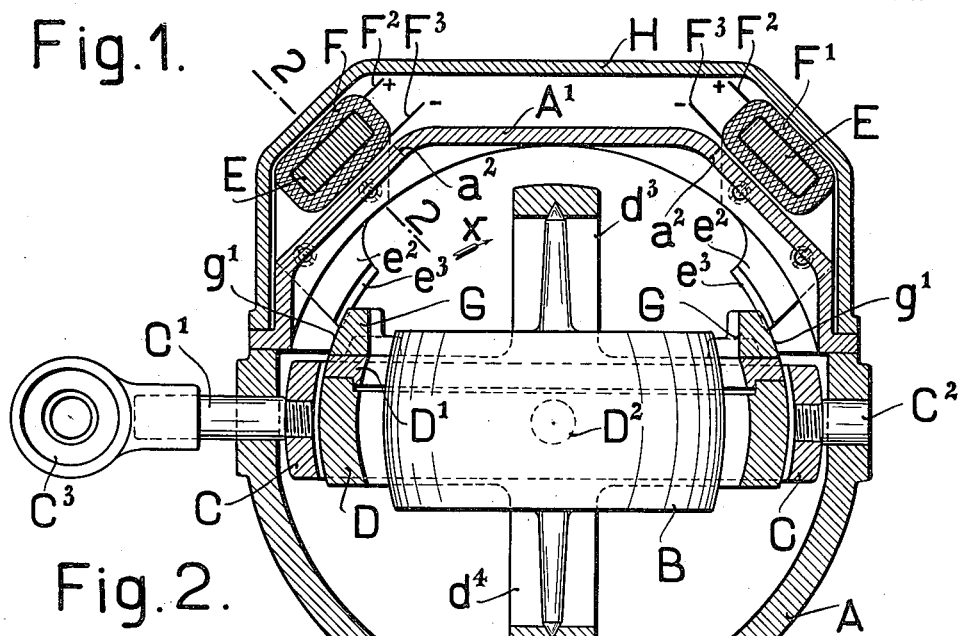
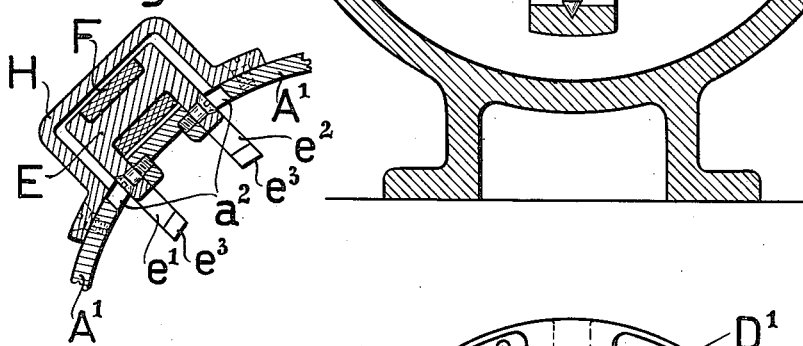
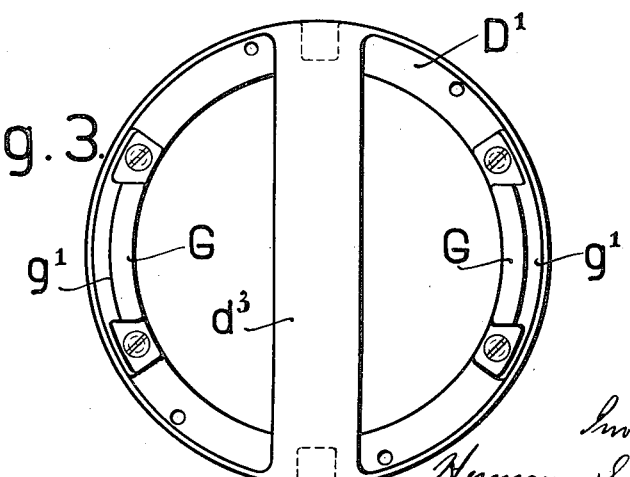
Inventor.
Hermann Sundhaussen
By Knight Bros.
Attys.

UNITED STATES PATENT OFFICE.

HERMANN SUNDHAUSSEN, OF ESSEN, GERMANY, ASSIGNOR TO FRIED. KRUPP AKTIENGESELLSCHAFT, OF ESSEN-ON-THE-RUHR, GERMANY.

GYROSCOPIC STABILIZER.

1,390,471.  Specification of Letters Patent.  Patented Sept. 13, 1921.

Application filed September 3, 1920. Serial No. 408,085.

*To all whom it may concern:*

Be it known that I, HERMAN SUNDHAUSSEN, residing at Essen, Germany, a citizen of the German Republic, have invented a certain new and useful Improvement in Gyroscopic Stabilizers, (for which I have filed application in Germany, May 6, 1916,) of which the following is a specification.

This invention relates to apparatus for maintaining the position of a body stabilized by a gyroscope in respect of an axis of rotation, and which in consequence of movements of precession of the gyroscope is under the influence of forces which tend to rotate it about the said axis. The object of the invention is to provide an apparatus of this kind, which enables the forces which are to act on the gyroscope for the purpose of maintaining the position of the body to act on the gyroscope in a manner that can be accurately graduated and easily controlled, and that without any part which serves for the suspension of the gyroscope needing to be touched and which in the second place affords the advantage that it together with the parts which carry the gyroscope can be entirely inclosed in a casing closed on all sides.

The invention will be described with reference to the accompanying drawings which show a construction of an arrangement of gyroscope constructed according to the invention in conjunction with a sighting telescope stabilized by the gyroscope.

Figure 1 is a vertical section through the center of the gyroscope arrangement,

Fig. 2 is a section on the line 2—2 of Fig. 1, looking from the right,

Fig. 3 is a plan view of a detailed part of Fig. 1 and

Figure 4:
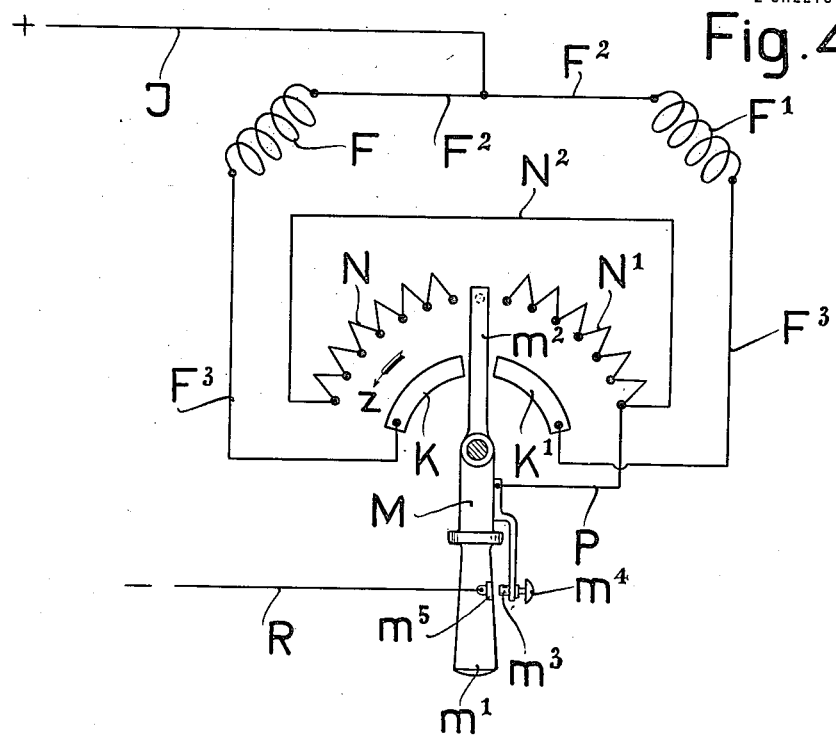
Fig. 4 is a diagram of connections belonging to the apparatus shown in Figs. 1 to 3.

The construction shown in Figs. 1 to 4 will be described first.

In a substantially spherical shaped casing A is suspended by means of a Cardan suspension a gyroscope B driven by an electromotor (not shown) about a vertical axis. For the Cardan suspension two rings are used, of which the outer one, C, can rotate about two horizontal Cardan pins $C^1$ and $C^2$ and the inner ring $D D^1$ which is composed of two rings D and $D^1$ screwed to each other can rotate about two likewise horizontal Cardan pins $D^2$ mounted in the ring C. Each of the two rings of the last mentioned Cardan ring $D D^1$ screwed to each other is composed of non-magnetic material and carries a semicircular stirrup $d^3$ and $d^4$ set at right angles to the plane of the ring and containing a gyroscope bearing. The adjacent faces of the rings C and $D D^1$ are turned down to spherical surfaces, the center point of which coincides with the point of intersection of the axes of the two Cardan shafts, so that the two rings can rotate freely with relation to each other. To the pin $C^1$ of the first mentioned Cardan ring C is rigidly connected a sighting telescope $C^3$.

The casing A is closed in by a cap-shaped cover $A^1$ of the form clearly shown in Fig. 1, and which cover $A^1$ has on each side of it two slots $a^2$ (see Figs. 1 and 2) which run symmetrically with the vertical axis of the gyroscope and the axes of the Cardan pins C $C^1$ and parallel with this plane. These slots are for the purpose of enabling the pole shoes $e^1$ and $e^2$ of electromagnets E of double-channel shaped formation mounted on the outside of the cover and screwed to the wall (see Fig. 2) to pass into the interior of the cover. On the bar of each electromagnet is arranged the winding F or $F^1$ which serves for its excitation and these windings are connected by means of conductors $F^2$ and $F^3$ across a switch device to be hereinafter described and illustrated in Fig. 2, to the two poles of a source of continuous current.

The pole shoes $e^1$ and $e^2$ are located correspondingly to the given position of the slots $a^2$ symmetrically with the planes passing through the vertical axis of the gyroscope and the axis of the Cardan pins $C^1$ and $C^2$. On the side next to the ring $D^1$ the pole shoes are turned down to a spherical surface $e^3$ the middle point of which coincides with the point of intersection of the axes of the two Cardan shafts. On to the ring $D^1$ are screwed in the manner shown in Figs. 1 and 3 two similar magnet armatures G, each of which is bisected by the plane of the vertical axis of the gyroscope and the axis of the Cardan pins $C^1 C^2$. Each of the two magnet armatures G is likewise turned down on the side next to the pole shoes $e^1$ and $e^2$ to a spherical surface $g^1$ the central point of which falls in the point of intersection of the axes of the two Cardan shafts.

The dimensions of the pole shoes $e^1$ and $e^2$ and the magnet armatures G are such that the spherical surfaces $e^3$ of the pole shoes, when the gyroscope is in the position shown in Fig. 1 in which position the axis of the gyroscope is vertical, overlap the spherical surfaces $g^1$ of the magnet armatures G only to a comparatively small amount and are such that the overlapping parts are only separated by a small gap. The openings which are provided in the cover $A^1$ of the casing by the slots $a^2$ are closed in together with the parts of the electromagnets E F and E $F^1$ by a cap H of substantially channel shape in cross section, which is screwed to the cover. The ends already mentioned of the exciting windings F and $F^1$ which lead to the switch apparatus are passed through the walls of the cap H and are packed therein.

The connection of the exciting windings F and $F^1$ to the two poles of a source of continuous current is carried out in the following way:—The two conductors $F^2$ which are connected to one end of the exciting windings F and $F^1$ (see Figs. 1 and 4) are connected by means of a conductor J to the positive pole of the source of continuous current. The two conductors $F^3$ connected to the other end of the exciting windings F and $F^1$ lead to two circuit closing devices K and $K^1$, which are separated by a gap and embrace each about a quarter of an arc of a circle in size and over which devices K and $K^1$ a controlling lever M adapted to rotate and provided with a handle $m^1$ is arranged to slide by means of a sliding piece $m^2$.

This sliding piece $m^2$ has a free end which projects beyond the circuit closing devices K and $K^1$ and by means of which it slides, when the controlling lever M is rotated, over the circuit closing devices of two adjustable resistances N and $N^1$ which likewise each extend over a quarter of an arc of a circle and are separated by a gap, the said gaps being larger than the width of the sliding piece $m^2$. From the outer end of the regulating resistance N a conductor $N^2$ leads to the outer end of the regulating resistance $N^1$ and from this point a conductor P leads to a circuit closing device elastically mounted on the controlling lever M. The circuit closing device $m^3$ can be brought into connection, by the depression of a knob $m^4$, with the circuit closing device $m^5$ mounted on the handle $m^1$, from which a conductor R leads to the negative pole of the source of continuous current.

Before describing the working of the above described apparatus it should be pointed out that according to the known laws of gyroscopes a turning moment exerted on the gyroscope about the axis of the pin $D^2$ causes a rotation of the ring C about the axis of the pins $C^1$ $C^2$ in a quite definite direction.

If therefore for any reason (e. g. owing to the precession of the gyroscope caused by friction in the bearings) rotation of the ring C and consequently of the sighting line of the telescope $C^3$ about the axis of the pins $C^1$ $C^2$ takes place in a direction, for example, which causes the part of the telescope originally pointed at the target and next to the observer to drop, the sighting line being therefore raised, it is necessary to rotate the ring D $D^1$ which carries the gyroscope, in order to erect the telescope again and turn the sighting line into its previous position. The direction of the rotation of the ring D $D^1$ required is at the same time determined by the direction of rotation of the gyroscope B. Assumed now that the gyroscope B rotates in such a direction that the results is a rotation of the ring D $D^1$ in the direction of the arrow $x$ (see Fig. 1) such action causes a rotation of the ring C, on which the sighting telescope $C^3$ is carried, thereby causing the end next to the observer to rise again.

To obtain the desired turning moment the controlling lever M is rotated in the direction of the arrow $z$ to such an extent that the sliding piece $m^2$ bears upon the circuit closing device K (see Fig. 4) and the circuit closing device $m^3$ simultaneously depressed on to the circuit closing device $m^5$. As when this is done (which can be clearly understood by referring to Fig. 4 without any further description) the free end of the sliding piece $m^2$ is connected in all cases to the regulating resistance N, then, so long as the circuit closing device $m^3$ remains in electrical connection with the circuit closing device $m^5$, the circuit J $F^2$ F $F^3$ K $m^2$ N $N^2$ P $m^3$ $m^5$ R leading from the positive pole of the source of continuous current to the negative pole thereof is closed, and therefore in the electromagnet E surrounded by the exciting winding F a flow of lines of force arises which flows for example from the pole shoe $e^1$ over the adjacent armature G to the pole shoe $e^2$. That part of the pole shoes $e^1$ $e^2$ which is separated from the corresponding armature G by the above mentioned small radial distance consequently saturates itself rapidly, and the lines of force flowing between the other parts of the pole shoes and the armature comprise a force which is applied tangentially at the circumference of the armature G, causing the armature G and with it the ring D $D^1$ to rotate in the direction of the arrow $x$. This rotation takes place the more rapidly as the greater that portion of the resistance K is which is cut out when the position of the sliding piece $m^2$ is altered.

As has been more fully described above, the rotation of the ring D D¹ in the direction of the arrow $x$ causes the ring C to rotate in such a direction that the part of the sighting telescope C³ rigidly attached to the ring C and situated next to the observer rises, and the sighting line is therefore depressed. As soon as the sighting line of the telescope C³ again points to the target, the circuit which contains the exciting winding F is opened by releasing the elastic circuit closing device $m^3$, which causes the electromagnet to become devoid of current, and the turning moment which was active up to the opening of the circuit ceases. The controlling switch is then brought into the middle position shown in Fig. 4.

As is clear without further description by referring to Fig. 4, it is possible by suitable rotation of the controlling switch M to cut the regulating resistance N either partially or wholly out of the circuit containing the exciting winding F and so to vary the excitation of the electromagnet and consequently the magnitude of the turning moment exerted on the ring D D¹. Furthermore by a brief depression and release of the elastic circuit closing device $m^3$ current impulses of short duration can be passed through the exciting winding in order to obtain as accurate as possible a fine adjustment of the sighting line of the telescope.

Figure 5:
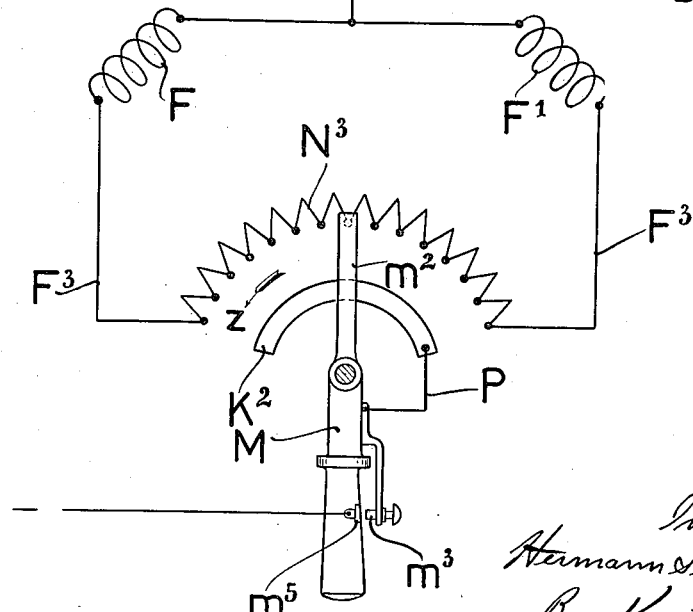
Fig. 5 shows a portion of a second and modified construction and a modified diagram of connections, which may be used for example, instead of the diagram of connections shown in Fig. 4 for an apparatus according to Figs. 1 to 3.

The second construction of switch device shown in Fig. 5 of the accompanying drawings differs from the one hitherto described by the fact that instead of employing the two circuit closing devices K and K¹ separated by a gap a single circuit closing device K² extending over a semicircle is employed, to which the conductor P leading to the circuit closing device $m^3$ is connected, and that there is also provided instead of the two regulating resistances N and N¹ likewise separated by a gap a single regulating resistance N³ likewise of semicircular shape the ends of which are connected by conductors F³ to the exciting windings F and F¹.

The arrangement shown in Fig. 5 is used as follows: Let it be supposed again that that part of the sighting telescope C³ (see Fig. 1) which is turned toward the observer has moved into too low a position owing to the movements of precession of the gyroscope. If now the circuit closing device $m^3$ be pressed down upon the circuit closing device $m^5$, then, when the sliding piece is in the middle position shown in Fig. 5 both the exciting windings F and F¹ will have passed through them currents of equal strength, so that the action of both the electro-magnets must mutually neutralize each other. If however the sliding piece $m^2$ be moved in the direction of the arrow $z$ (see Fig. 5) then in consequence of the reduction of that part of the regulating resistance which acts on the winding F and the simultaneous increase of the regulating resistance which acts on the winding F¹ the winding F will receive a stronger and the winding F¹ a weaker excitation than formerly. There is therefore a preponderance of the magnetic pull in the direction of the arrow $x$ (see Fig. 1) so that an erection of that part of the telescope C³ next to the observer takes place in the manner hereinbefore described. As soon as the telescope C³ has again acquired its direction on the target, the controlling lever M is brought into the middle position shown in Fig. 5.

The advantage of the arrangement shown in Fig. 5 is, compared with the one shown in Fig. 4, that it acts much more sensitively than the latter, because both magnets are always excited and the forces which erect the gyroscope are proportionally equal to the difference of the two turning moments acting on the armature G.

Claims:

1. An apparatus of the class described which comprises a gyroscope, a Cardan suspension therefor, a body to be stabilized operatively connected to said gyroscope, a stationary casing, spaced electro-magnets carried by said casing, armatures carried by the Cardan suspension and means for energizing said electro-magnets, for exerting a turning movement to the gyroscope which will cause an adjustment of the body to be stabilized.

2. An apparatus of the class described which comprises a stationary casing, a gyroscopic apparatus, a Cardan suspension for said gyroscopic apparatus, a body to be stabilized operatively connected to said gyroscope, spaced electro-magnets carried by said casing, coöperating armatures operatively connected to the gyroscopic apparatus and symmetrically arranged with regard to a plane passed through the middle position of the gyroscope axis and the axis of rotation of the Cardan suspension carrying the gyroscope and means for energizing said electro-magnets, for exerting a turning movement to the gyroscope which will cause an adjustment of the sighting telescope.

3. An apparatus of the class described which comprises a casing, a gyroscopic apparatus suspended within said casing, a sighting device, means operatively connecting said sighting device to the gyroscopic apparatus, two oppositely disposed electro-magnets supported within said casing, two coöperating armatures mounted for movement with said gyroscopic apparatus, and symmetrically arranged with regard to a plane passed through the middle position of the gyroscope axis and the axis of rotation of the Cardan suspension carrying the gyroscope, an electric circuit including said electro-magnets and means included in said circuit for regulating the degree of excitation of the electro-magnets to vary the position of said sighting device.

4. An apparatus of the class described which comprises a casing, a gyroscopic apparatus suspended within said casing, a sighting device operatable by the gyroscopic apparatus, electro-magnets carried by said casing, coöperating armatures carried by said gyroscopic apparatus, and symmetrically arranged with regard to a plane passed through the middle position of the gyroscope axis and the axis of rotation of the Cardan suspension carrying the gyroscope, an electric circuit including said electro-magnets and means for regulating the excitation of said electro-magnets which comprises resistance elements, a rotatable switch for varying the degree of resistance in circuit with an electro-magnet and a circuit closing switch on said rotatable switch.

5. An apparatus of the class described which comprises a casing, a gyroscopic apparatus suspended within said casing, a Cardan suspension for said gyroscope, a sighting device operatable by the gyroscopic apparatus, electro-magnets carried by said casing, coöperating armatures carried by said gyroscopic apparatus and symmetrically arranged with regard to a plane passed through the middle position of the gyroscopic axis and the axis of rotation of the Cardan suspension carrying the gyroscope, an electric circuit including the exciting coils of said electro-magnets and means for regulating the current in said exciting coils, said means comprising a resistance and a pair of conductors connecting the ends of said resistance to said coils.

The foregoing specification signed at Essen, Germany, this 16th day of June, 1920.

HERMANN SUNDHAUSSEN.

In presence of—
  HANS GOTTSMANN,
  JOHANN DECKERS.